United States Patent
Schipper

(10) Patent No.: US 7,477,744 B2
(45) Date of Patent: Jan. 13, 2009

(54) DEVICE AND METHOD FOR SELECTIVELY SUPPLYING ACCESS TO A SERVICE ENCRYPTED USING A CONTROL WORD, AND SMART CARD

(75) Inventor: Robert Schipper, Eindhoven (NL)

(73) Assignee: Irdeto Eindhoven B.V., Eindhoven (NL)

( * ) Notice: Subject to any disclaimer, the term of this patent is extended or adjusted under 35 U.S.C. 154(b) by 954 days.

(21) Appl. No.: 10/480,268

(22) PCT Filed: Jun. 6, 2002

(86) PCT No.: PCT/IB02/02138

§ 371 (c)(1),
(2), (4) Date: Dec. 8, 2003

(87) PCT Pub. No.: WO02/102075

PCT Pub. Date: Dec. 19, 2002

(65) Prior Publication Data

US 2004/0170278 A1   Sep. 2, 2004

(30) Foreign Application Priority Data

Jun. 8, 2001   (EP) .................... 01202194

(51) Int. Cl.
*H04N 7/167*   (2006.01)
(52) U.S. Cl. ............ 380/239; 348/E7.056; 348/E7.061; 386/E5.004
(58) Field of Classification Search ............ 380/239
See application file for complete search history.

(56) References Cited

U.S. PATENT DOCUMENTS 5,590,197 A * 12/1996 Chen et al. .............. 705/65
5,852,290 A * 12/1998 Chaney .................. 235/492

(Continued)

FOREIGN PATENT DOCUMENTS

EP   1 094 667   4/2001

(Continued)

OTHER PUBLICATIONS

EBU Project Group, 'Functional model of a conditional access system', EBU Technical Review, Winter 1995, pp. 64-77, entire article, http://www.ebu.ch/en/technical/trev/trev_266-ca/pdf.*

*Primary Examiner*—Kristine Kincaid
*Assistant Examiner*—Ronald Baum
(74) *Attorney, Agent, or Firm*—Schwegman, Lundberg & Woessner, P.A.

(57) ABSTRACT

Device (120), smart card (300) and method for selectively supplying access to a service (202) encrypted using a control word. A service (202) is received with an entitlement control message (ECM) (203) comprising authorization data and a specifier of a validity period of the authorization data. The service is decrypted only if the ECM (203) is found valid. The service (202) can be stored on a storage medium such as a DVD. An ECM transcoding module (211) obtains the authorization data from the ECM (203) supplies to writing means (215) a device-specific ECM comprising the authorization data. The device-specific ECM may be encrypted with a key specific to the device (120) and/or comprise an identifier for the device (120).

19 Claims, 2 Drawing Sheets

Figure 1:
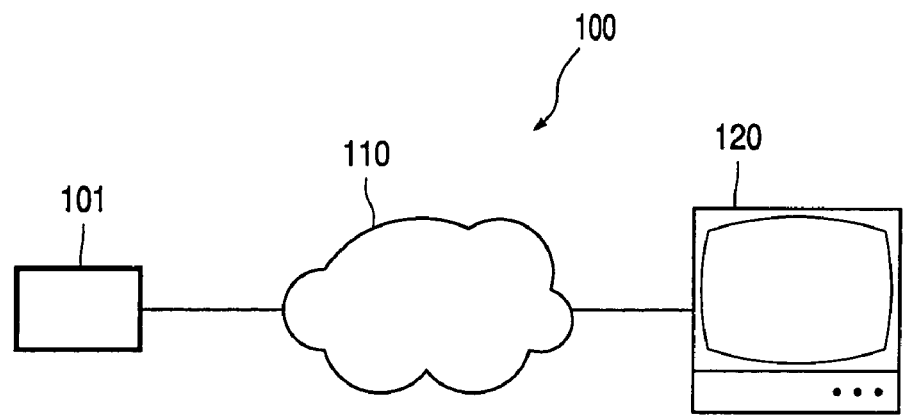

U.S. PATENT DOCUMENTS 5,991,400 A * 11/1999 Kamperman ................ 380/239
6,105,134 A *  8/2000 Pinder et al. ................ 713/170
6,327,652 B1* 12/2001 England et al. ................ 713/2
6,516,412 B2*  2/2003 Wasilewski et al. ......... 713/168
6,804,357 B1* 10/2004 Ikonen et al. ............... 380/241

FOREIGN PATENT DOCUMENTS

WO    WO 88 06826    9/1988

* cited by examiner

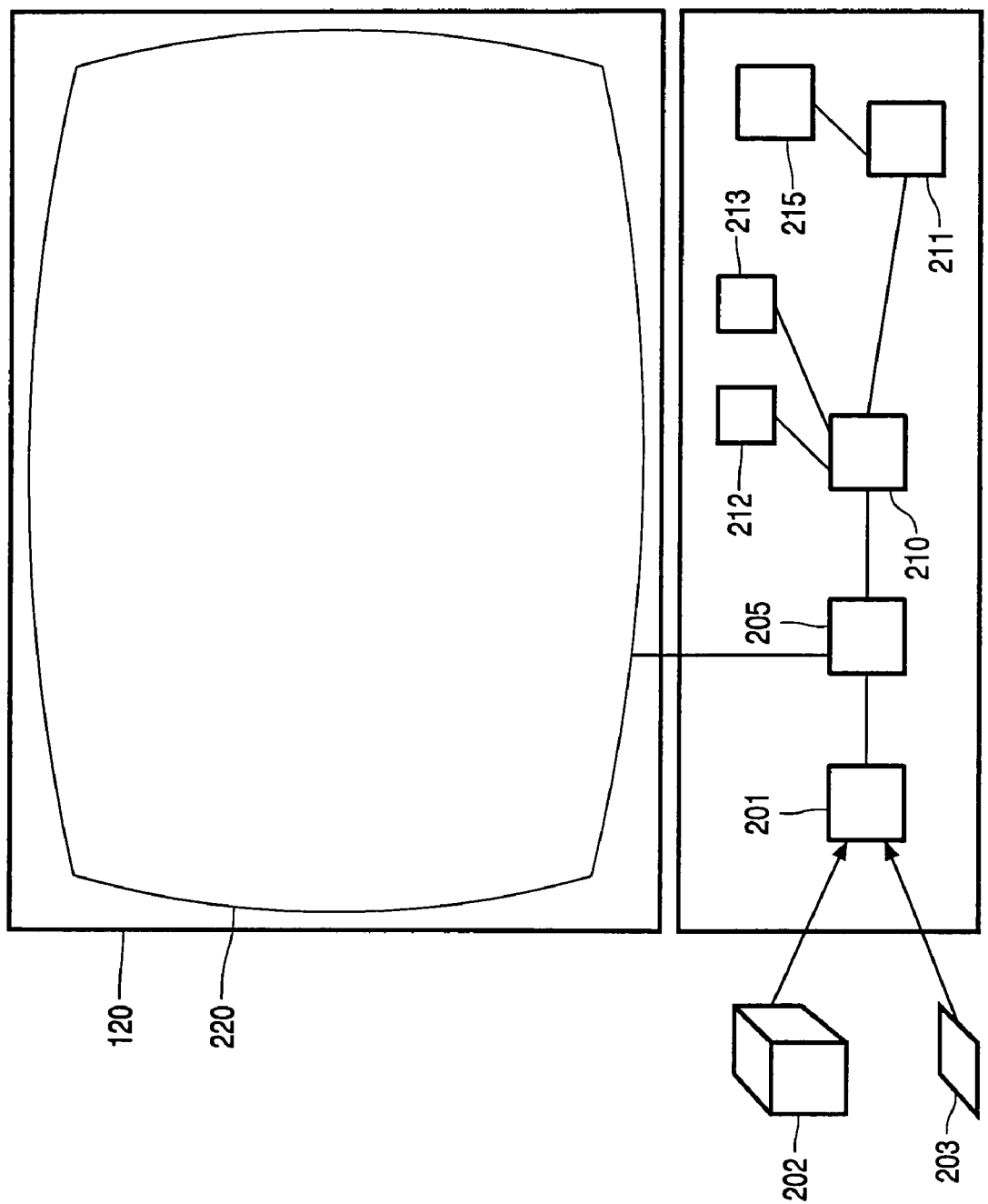

DEVICE AND METHOD FOR SELECTIVELY SUPPLYING ACCESS TO A SERVICE ENCRYPTED USING A CONTROL WORD, AND SMART CARD

The invention relates to a device for selectively supplying access to a service encrypted using a control word, comprising receiving means for receiving the service and an entitlement control message (ECM) comprising authorization data and a specifier of a validity period of the authorization data, decrypting means for decrypting the service using the control word, a timer for providing a time, and conditional access means for obtaining the authorization data and the specifier of the validity period of the authorization data from the ECM and providing the control word to the decrypting means in dependence on a verification of the authorization data and on a determination of the time being within the validity period.

The invention further relates to a method of selectively supplying access to a service encrypted using a control word, comprising receiving the service and an entitlement control message (ECM) comprising authorization data and a specifier of a validity period of the authorization data, providing the control word in dependence on a verification of the authorization data and on a determination of the time being within the validity period obtained from the CM, and decrypting the service using the control word.

A device according to the preamble is known from U.S. Pat. No. 6,005,938. Service providers, such as subscription-based television providers, typically protect information which they distribute as part of their service from being accessed by users who have not paid for the service by encrypting that information. User who want to access the service must obtain a so-called entitled control message (ECM) comprising authorization data in order to access the service. The ECM will typically comprise a control word or decryption key which can be used to decrypt the encrypted service. Alternatively, the control word can be stored in a smart card which the user has bought before and which he needs to insert in his television or set-top box. In that case, the ECM comprises authorization data which causes the smart card to provide the control word to the decryption module. Using the control word, the decryption module can decrypt the service and allow the user to access it. This way the user can view the subscription-based television or access an interactive service.

In such an arrangement, a user could record an ECM which he receives from the service provider, and use it again in order to access the service once again. This allows him to access the service without paying for it. To prevent this, the service providers often insert a specifier of a validity period of the ECM in the ECM. The smart card or set-top box which receives the ECM will check the specifier or the validity period against the time at which the user wants to access the service and refuse to provide the control word to the decrypting module if the current time falls outside the validity period.

For some applications, local storage of the information related to the service is required. For example the user may want to record a television program provided through the subscription-based television service so that he can view it later at his convenience. However, if the information is stored in a plain form, access control is gone. In order to make sure that the access control stays intact, the information is stored in the encrypted format. In order to allow the user to later access the stored information the ECM needs to be stored as well. However, because of the specifier of the validity period of the ECM, the stored information may become inaccessible when the user wants to play it after the validity period has expired. This means that the user cannot access the information he bought at the time he chooses.

It is an object of the invention to provide a device according to the preamble, which is more flexible with regard to providing access to the service.

This object is achieved according to the invention in a device which is characterized by ECM transcoding means for obtaining the authorization data from the ECM and for supplying to writing means a device-specific ECM comprising the authorization data. By creating a device-specific ECM it becomes possible to access the stored services or information at any moment because the device-specific ECM does not comprise a validity period.

In an embodiment the conditional access means are arranged for providing the control word if it is present in the authorization data. This way the device does not need to store the control word in the secure storage somewhere but can simply obtain the control word from the authorization data in the ECM.

In a further embodiment the ECM transcoding means are comprised in a smart card. It is desirable to have the conditional access means stored in a secured fashion so that malicious users cannot tamper with them. The same of course goes for the ECM transcoding means. By putting these means in a smart card it becomes much harder for a malicious user to tamper with it in order to obtain device-specific ECMs for other devices.

In a further embodiment the device-specific ECM comprises an identifier for a group of devices, the device being an element of said group. A greater flexibility can be obtained by not restricting the device-specific ECM to one particular device. Instead the device-specific ECM can be provided with a group identifier or a number of identifiers of specific devices. This allows the user to, for example, record the encrypted service on one device and to play it back on another device.

In a further embodiment the device-specific ECM comprises an identifier for the device. In order to prevent the user from using that device-specific ECM at another device, an identifier for the device is recorded in the device-specific ECM. This way the user can only use the device-specific ECM at that particular device.

In a further embodiment the device-specific ECM is encrypted with an encryption key for which the device has a corresponding decryption key. By encrypting the device-specific ECM, the user will be unable to access the device-specific ECM using any device other than the one in which the device-specific ECM has been created. This protects against copies of the device-specific ECM being distributed to unauthorized third parties.

It is a further object of the invention to provide a method according to the preamble, which provides more flexibility with regard to supplying access to the service.

This object is achieved according to the invention in a method which is characterized by the step of obtaining the authorization data from the ECM and for supplying to writing means a device-specific ECM comprising the authorization data. By creating a device-specific ECM it becomes possible to access the stored services or information at any moment because the device-specific ECM does not comprise a validity period.

It is a further object of the invention to provide a smart card for use in a device according to the invention which provides greater flexibility in the device with respect to providing access to the service.

This object is achieved according to an invention in a smart card which is characterized by ECM transcoding means for obtaining authorization data from an ECM and for supplying to writing means a device-specific ECM comprising the authorization data. By storing the ECM transcoding means on a smart card a greater level of security for the ECM transcoding means is achieved. Further the user can use his smart card with any device that can receive it and so is not restricted to one particular device having ECM transcoding means.

In an embodiment the smart card further comprises conditional access means for obtaining a specifier of a validity period of the authorization data from the ECM and providing a control word to decryption means in dependence on the verification of the authorization data and on a determination of the time being within the validity period. By providing the conditional access means on the smart card as well it is achieved that the smart card can be used as a single conditional access mechanism which can be used in any device that is equipped with smart card reading means.

Figure 3:
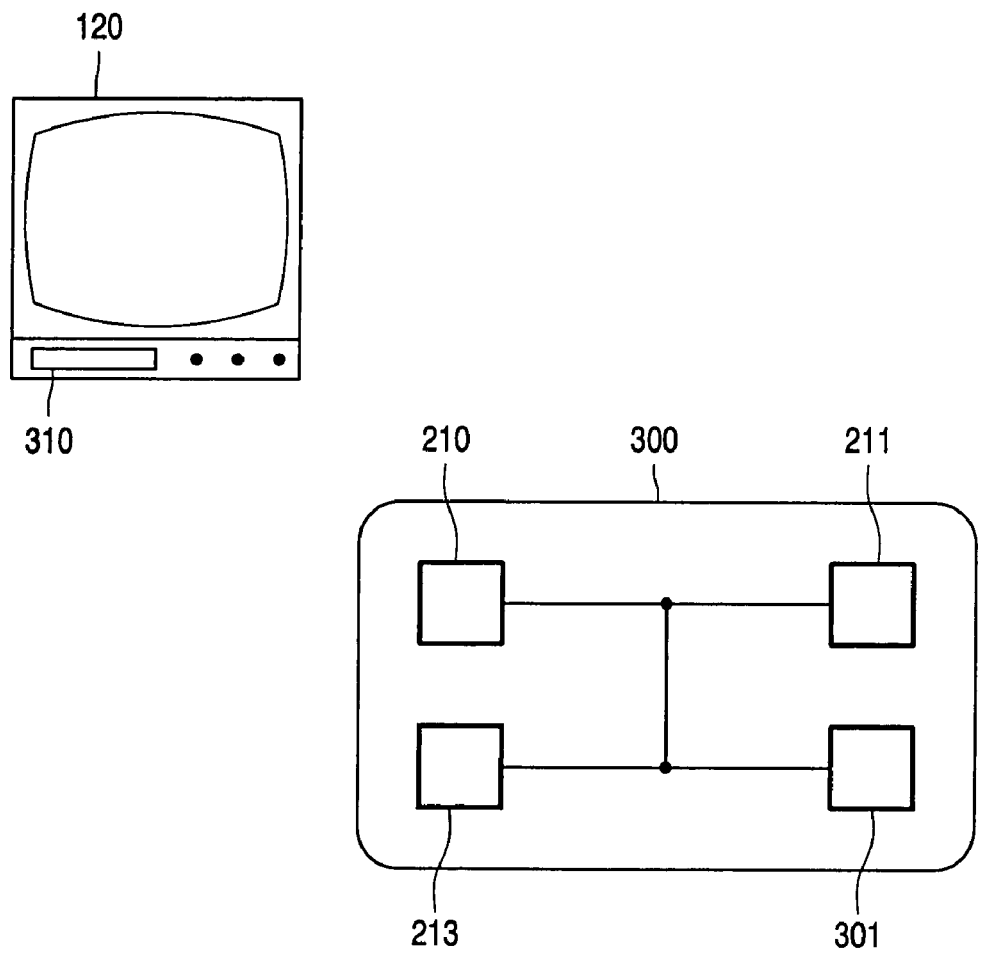

These and other aspects of the invention will be apparent from and elucidated with reference to the embodiment shown in the drawings in which:

FIG. 1 schematically shows an arrangement according to the invention comprising a service operator and a receiving device;

FIG. 2 schematically shows the device according to the invention in more detail; and FIG. 3 schematically shows a smart card according to the invention in more detail.

Throughout the figures same reference numerals indicate similar or corresponding features. Some of the features indicated in the drawings are typically implemented in software, and as such represents software entities such as software modules or objects.

FIG. 1 schematically shows an arrangement 100 comprising a service operator 101 and a receiving device 120 connected via a network 110 such as the Internet or a cable television network. Using the network 110 the service provider 101 can provide instances of a service to the receiving device 120, for example by allowing the user of the receiving device 120 to access a subscription-based television service. The receiving device 120 can take many forms, such as a set-top box, a television, a radio, a personal computer and so on. The service provider 101 can provide the service in many ways. In some cases the service provider broadcasts the encrypted service to all receiving devices which are connected via the network and only receiving devices having appropriate descrambling means can descramble and access the service. In other cases, the service provider 101 only provides instances of the service, such as a specific movie or television program to a specific subscriber who has asked for it.

Typically the user of a receiving device 120 should only be able to access the service if he has paid for it. In order to restrict access, the service provider 101 encrypts the service or the instances thereof which he distributes to the receiving device 120. The user of the receiving device 120 must then obtain the appropriate control words necessary to decrypt the service. There are many ways in which the distribution of control words to the users can be facilitated. The control word can be stored in the receiving device 120 or it may be distributed by the service provider 101 to the receiving device 120 upon a payment from the user. The control word can be distributed via the network 110 or be stored on a smart card which the user can insert in the receiving device 120.

If the control word is stored in the receiving device 120 authorization must be sent by the service provider 101 to the receiving device so that it will use the control word to access the service. If no authorization is received the receiving device must refuse to decrypt the service. The authorization is distributed in the form of a so-called entitlement control message (ECM). Upon receipt of a valid authorization for accessing the service the device uses the control word to provide the user access to the service. If the control word is not available in the receiving device 120 itself, and not made available on a smartcard either, the service provider 101 must send the control word as a part of the ECM.

FIG. 2 shows the receiving device 120 in more detail. The device comprises a receiving module 201 which receives a service or an instance thereof 202 and an ECM 203 from the service provider 101. The instance 202 is fed to a decrypting module 205 which decrypts the instance 202 using a control word and feeds the decrypted instance to a rendering module 220 such as a television screen. This way the user can access the service or view the instance 202.

The control word is provided to the decryption module 205 by a conditional access module 210. The conditional access module 210 obtains authorization data and a specifier of the validity period of the authorization data from the ECM 203. First the conditional access module 210 checks the validity of the authorization data. The service provider 101 might for instance digitally sign the ECM 203 and then the conditional access module 210 verifies the digital signature. Additionally, it may need to check that the ECM 203 is indeed intended for use with the received instance 202.

Further, the conditional access module 210 needs to verify that the ECM 203 is still valid. The device 120 is to this end provided with a timer 212, such as a real time clock, which provides the current time to the conditional access module 210. The conditional access module 210 then makes a determination whether the time is within the validity periods as indicated in the ECM. The validity period can be specified in the ECM 203 as a combination of a beginning or end date by a date and a valid representing a period of time or simply by a value representing a period of time. Additionally the validity period may specify a period in which the user may not receive the instance of the service.

If the conditional access module 210 finds that the ECM 203 is valid and that the current time is within the validity period, the conditional access module 210 provides the control word to the decrypting module 205. The control word may be present in the ECM 203 or it may be stored in the device 120 itself.

The user of the device 120 may want to store the received instance 202 on a storage medium such as a hard disk, DVD+ RW or CD-RW. To this end, the device 120 comprises a writing module 215 such as a video recorder, a Digital Versatile Disc (DVD) writer, or a compact disc (CD) writer. This allows the user to save the received instance for later viewing. The writing module 215 must also store the authorization data present in the ECM 203. Storing the received instance 202 may require permission from the service operator 101. This permission could e.g. be given in the ECM 203 itself, or in another entitlement message.

If the control word is present in the ECM 203, then also the control word needs to be stored on the storage medium. Without the control word, it is impossible to access the stored instance 202. The instance 202 is stored in encrypted form.

An ECM transcoding module 211 obtains the authorization data from the ECM 203 and supplies to the writing module 215 a device-specific ECM which comprises the authorization data. Since the device-specific ECM does not comprise a specifier or a validity period the validity of the device-specific ECM is unlimited. This way, the user can play back the instance at any time he chooses which makes this device very flexible.

However, it is desirable that the authorization data stored in the device-specific ECM is protected in some way against unauthorized usage. For example, the user may make copies of the device-specific ECM from the storage medium and distribute those, so many people can access the stored instance. Since the service operator 101 normally charges every user for access, this is undesirable.

There are various ways in which the device-specific ECM can be protected against such misuse. In a preferred embodiment, the device-specific ECM further comprises an identifier for the device 120. When at a later time the receiving module 201 receives the instance 202 from the storage medium, the conditional access module 210 will obtain the authorization data stored in the device-specific ECM, which authorization data comprises the identifier for the device. The conditional access module 210 then compares the identifier for the device as stored in the device-specific ECM with an identifier for the device 120. If the two identifiers match, the conditional access module 210 provides the control word stored in a device-specific ECM to the decrypting module 205.

The identifier for the device can also be realized as an identifier for a group of devices as long as device 120 is an element of said group. The conditional access module 210 then must verify that the device 120 is a member of the group when the device-specific ECM is provided to it.

To protect the device-specific ECM against misuse, it may be encrypted with an encryption key for which the device 120 has a corresponding decryption key. That way, only the device 120 will be able to decrypt the encrypted device-specific ECM and access the authorization data therein. This can be realized with public key cryptography, although of course also secret-key schemes can be used. A public/private key pair is stored in the device 120. The ECM transcoding module 211 accesses the public part of the key pair and encrypts the device-specific ECM with it. Later, the conditional access module 210 accesses the private part of the key pair and decrypts the device-specific ECM therewith.

The device 120 may comprise an decryption module 213, in which at least the private part of the key pair is stored. This way, malicious users cannot make a copy of the private part to decrypt the encrypted device-specific ECM and illegally access the authorization data. The decryption module 213 may be arranged to decrypt the encrypted device-specific ECM itself, or to provide the conditional access module 210 with the private part of the key pair when necessary.

The decryption key may be unique for the device 120, so that only the device 120 can access the authorization data. It may also be shared by a group of devices, whereby the device 120 is a part of that group. This allows the authorization data to be stored by one device and accessed by another device of the group.

Multiple copies of the device-specific ECM may be stored, each copy encrypted once for every device that is permitted to access it. Each of these devices can then access its own copy, but other devices cannot access the device-specific ECM.

In a further embodiment, the service provider 101 activates an "identify receiver" option. This option is present in the private CA parameters of the ECM 203. The option contains an AND mask and/or an OR mask. When present, the masks are used to mask the unique identification pattern of the receiving device to allow for group access. In this embodiment, it is required that each receiving device has a unique identification pattern or identifier.

To generate the group identification, the ECM transcoding module 211 applies the AND-mask and the OR-mask to the device identifier for the receiving device 120. For example, the group identifier can be calculated as (device identifier AND AND-mask) OR OR-mask.

The ECM transcoding module 211 then combines the group identifier with the above-mentioned encryption key to generate an encryption key for encrypting the device-specific ECM. The device-specific ECM then contains the original AND and/or OR masks, and the encryption key result.

The encryption key for encrypting the device-specific ECM is preferably concatenated with the group identifier and fed to a hashing function. Output of the hashing function is a diversified key which is used for checking, generating, decrypting and encrypting of the device-specific ECM. An advantage of this approach is that this device-specific ECM can now be used immediately by any device within the group. Further, by using the hash function the length of the output does not depend on the length of the input.

FIG. 3 shows a smart card 300 comprising the conditional access module 210, the ECM transcoding means 211 and a secure storage module 301. Since the conditional access module 210 and the ECM transcoding module 211 deal with the authorization data and in effect provide the user with access to the service, they must be secured as much as possible. An effective way to protect these modules is to embody them on a smart card. Smart cards are much more difficult to compromise than ordinary computers or software and so offer a better way of protecting the conditional aspects of the conditional access service. The device 120 is then equipped with a smart card reading module 310, in which the user can insert the smart card 300. The smart card reading module 310 also facilitates the communication between the receiving module 201 and the decrypting module 205 embodied in the device 120, and the conditional access module 210 and the ECM transcoding module 211 embodied in the smart card.

The control word necessary to decrypt the service can be stored in the secure storage module 301 on the smart card. This way, it is very difficult for the user to obtain the control word, and so it is very difficult for him to access the service without paying for it.

It is possible that the device 120 has been tampered with in such a way that it will not simply decrypt the service, but instead store the control word or store the unencrypted service without the permission from the service provider 101. In order to prevent such a modified device from accessing the control word, the smart card 300 may employ an authentication mechanism in order to verify whether the device 120 has been tampered with. This authentication mechanism is for instance realized by having the smart card issue an encrypted 'challenge' to the device 120, which the device 120 must decrypt and send back to the smart card 300. If the device 120 cannot correctly decrypt the challenge, it is not an compliant device and may not get access to the control word. Alternatively, the smart card 300 can check the integrity of some part of the program code to be executed by the device 120, for example by verifying a digital signature.

If the control word is not stored in secure storage module 301, but instead is provided in the ECM 203, the ECM 203 is provided to the smart card 300 and thereby to the conditional access module 210, which obtains the control word from the ECM 203. The control word will often be present in an encrypted form in the ECM 203, and so the conditional access module 210 will need to decrypt the control word first. The decryption key necessary to decrypt the control word can then be stored in a secure storage module 301.

The smart card 300 in a further embodiment further comprises the decryption module 213. This allows the user to access the encrypted device-specific ECM on any device with which he can use the smart card 300. The encryption key used to encrypt the device-specific ECM then needs to be one for which the corresponding decryption key is available in the decryption module 213.

The invention claimed is:

1. A device for selectively supplying access to a service that is encrypted using a control word, the device comprising:
   a receiving module for receiving the service that is encrypted using the control word, the receiving module operable to receive an entitlement control message (ECM) comprising authorization data and a specifier of a validity period of the authorization data;
   a decrypting module coupled to the receiving module, the decrypting module for decrypting the service using the control word;
   a timer for providing a time used to compare the time to a specifier of a validity period of the authorization data;
   a conditional access module coupled to the decrypting module and the timer, the conditional access module operable to obtain the authorization data and the specifier of the validity period of the authorization data from the ECM, the conditional access module operable to provide the control word to the decrypting module in dependence on a verification of the authorization data and on a determination of the time provided by the timer being within the validity period;
   an ECM transcoding module coupled to the conditional access module, the ECM transcoding module operable to generate, from the ECM, a device-specific ECM, the device-specific ECM associated with the received service, the device-specific ECM including the authorization data, wherein the device-specific ECM includes a first identifier for a specific device where the receiving module is located;
   a writing module coupled to receiving module and to the ECM transcoding module, the writing module operable to store the received service, and to store the generated device-specific ECM associated with the received service;
   the conditional access module operable to obtain, from the writing module, the stored received service and the stored device-specific ECM associated with the received, to compare a second identifier for the specific device with the first identifier from the device-specific ECM, and to provide the authorization data from the device specific ECM to the decrypting module for decrypting the received service only if the first identifier matches the second identifier.

2. The device of claim 1, whereby the conditional access module is operable to provide the control word to the decryption module when the conditional access module is provided authorization data from the device-specific ECM regardless of whether the validity period for the ECM associated with the service has expired.

3. The device of claim 1, whereby the ECM transcoding module is comprised in a smartcard.

4. The device of claim 1, whereby the device-specific ECM comprises an identifier for a group of devices, the device being an element of said group.

5. The device of claim 1, whereby the device-specific ECM including the first identifier for the specific device is stored on a smartcard communicatively coupled to the specific device.

6. The device of claim 1, whereby the device-specific ECM is encrypted with an encryption key for which the device has a corresponding decryption key.

7. The device of claim 1, wherein the device-specific ECM does not have any specified validity period.

8. The device of claim 1, including:
   a decryption module coupled to the control word module, the decryption module operable to provide a private key for use in decrypting an encrypted version of the device-specific ECM.

9. The device of claim 1, wherein the decryption module is stored in a smartcard.

10. A method of selectively supplying access to a service that is encrypted using a control word, the method comprising:
    receiving an entitlement control message comprising authorization data and a specifier of a validity period of the authorization data;
    generating from the entitlement control message a device-specific ECM including the authorization data and a first identifier, the first identifier specific to at least one particular device receiving the entitlement control message;
    receiving the service that is encrypted using the control word;
    providing, at the approximate time of receiving the service, the control word dependent on a verification of the authorization data and on a determination of the approximate time being within the validity period obtained from the entitlement control message;
    decrypting the service using the control word;
    storing the service that is encrypted;
    storing the device-specific ECM;
    providing, at some time later than the approximate time of received the service, the stored service and the stored device-specific ECM;
    determining if the first identifier of the stored device-specific ECM matches a second identifier, the second identifier identifying the particular device, and providing the authorization data from the device-specific ECM only if the first identifier matches the second identifier; and
    providing a control word for decrypting the stored services based on the authorization data from the device-specific ECM if the authorization is provided.

11. The method of claim 10, including:
    encrypting the device-specified ECM using an encryption key;
    storing a corresponding decryption key for the encryption key on the particular device;
    decrypting at the particular device the stored and encrypted device-specific ECM using the decryption key; and
    providing the authorization data from the decrypted device-specific ECM for access to the control word used to decrypt the stored and encrypted service.

12. The method of claim 11, wherein the decryption key is unique for the particular device, and only the particular device is operable to access the authorization data included in the device-specific ECM using the decryption key.

13. The method of claim 11, wherein encrypting the device-specific ECM using an encryption key includes:
    storing multiple copies of the device-specific ECM, each copy of the encrypted device-specific ECM encrypted for a given particular device of a plurality of devices, the given particular device permitted to access a particular copy of the multiple copies, and wherein none of the plurality of devices other than the given particular device can access the particular copy of the device-specific ECM that has been encrypted for the given particular device.

14. The method of claim 10, wherein the first identifier includes a group identifier for a plurality of devices of which the particular device is an element of said plurality of devices.

15. The method of claim 14, including:

providing each of a plurality of devices with a unique identifier; and generating a group identification for the plurality of receiving devices by applying an AND mask and then an OR mask to a device identifier.

16. The method of claim 15, including:

generating an second encryption key by combing the group identification with an first encryption key to generate the second encryption key of the device-specific ECM, the second encryption key including the first encryption key and the AND mask and the OR mask.

17. A smartcard for use in a device that selectively supplies access to a service that is encrypted using a control word, the smartcard comprising:

an entitlement control message transcoding module for obtaining authorization data from an entitlement control message (ECM) and for generating and supplying to a writing module a device-specific ECM comprising the authorization data and an identifier for the device.

18. The smartcard of claim 17, further including:

a conditional access module for obtaining a specifier of a validity period of the authorization data from the ECM and providing a control word to a decrypting module dependent on a verification of the authorization data and on a determination of the time being within the validity period.

19. The smartcard of claim 17, further including:

a secure storage module, the secure storage module coupled to the conditional access module and operable store the generated device-specific ECM in the secure storage module;

the conditional access module operable, upon receiving a request from the device and at some time after receiving the encrypted service, to provide as an output from the smart card a control word included in the device-specific ECM only if the identifier included in the device-specific ECM matches an identifier for the device making the request.

\* \* \* \* \*